Figure 1:
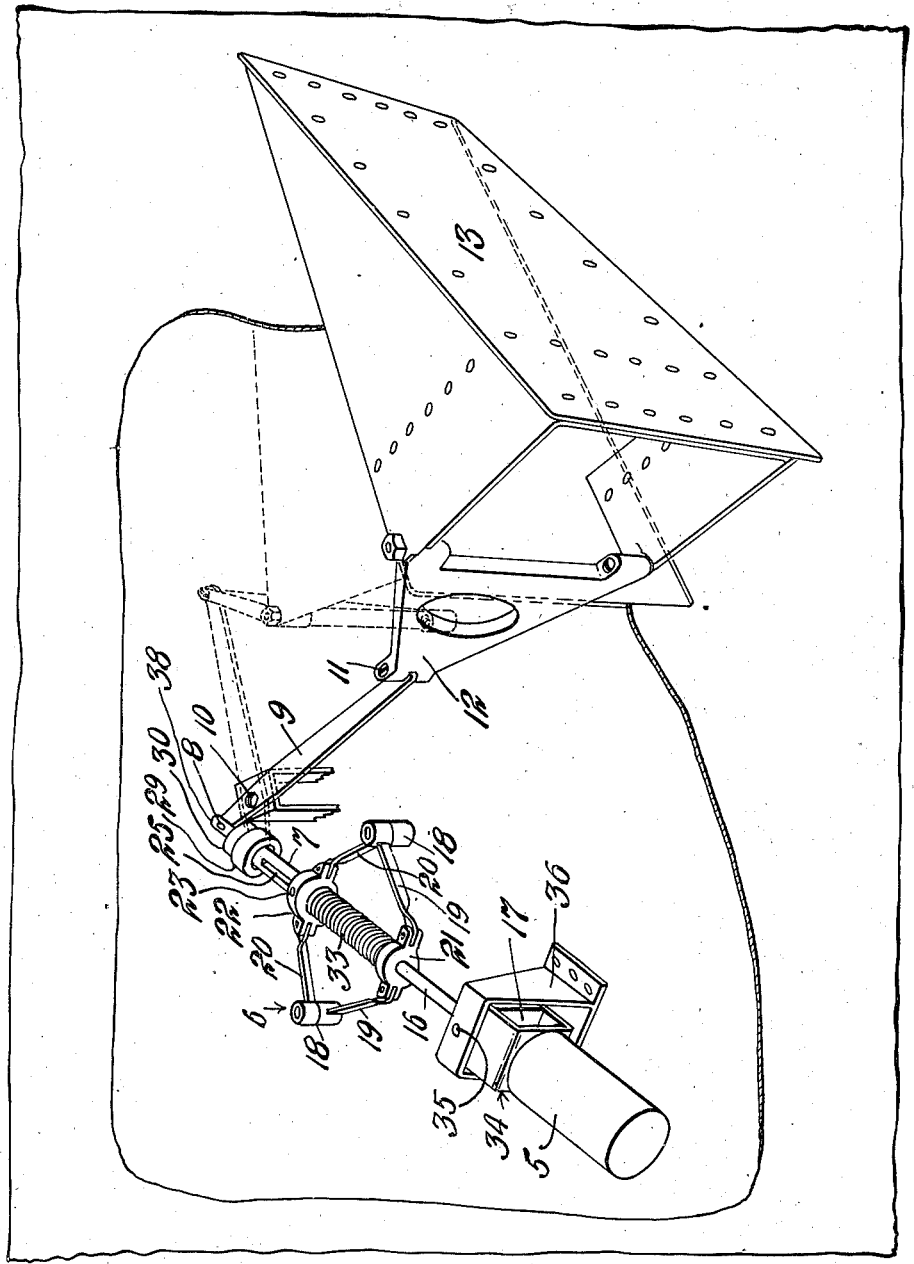

June 29, 1948.  R. R. JENNER  2,444,257
ACTUATOR
Filed Oct. 5, 1943  2 Sheets-Sheet 1

INVENTOR.
Ray R. Jenner
BY
Philip S. ......
ATTORNEY

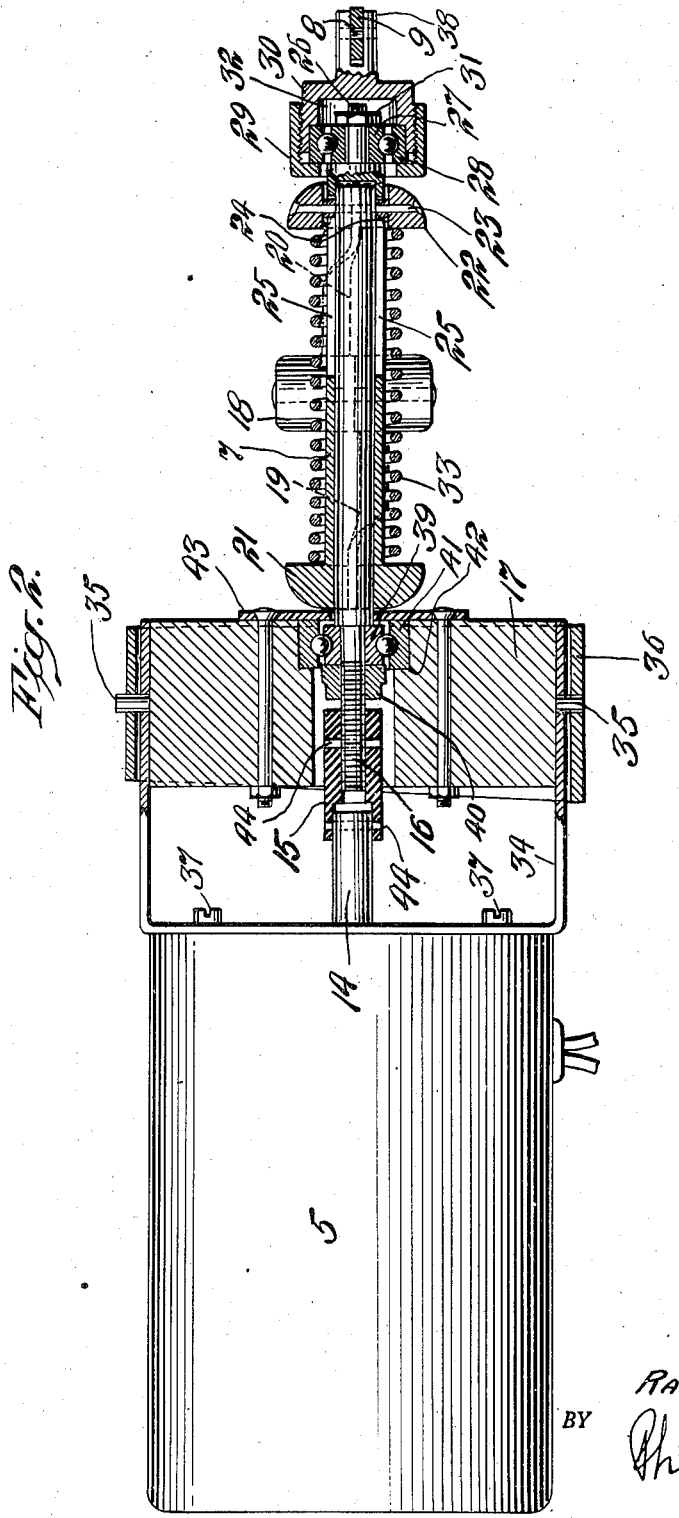

Patented June 29, 1948

2,444,257

UNITED STATES PATENT OFFICE 2,444,257

ACTUATOR

Ray Richard Jenner, Wichita, Kans.

Application October 5, 1943, Serial No. 505,083

7 Claims. (Cl. 264—2)

The invention herein disclosed relates to mechanisms for performing various mechanical operations, particularly such as actuating a device at some remote point.

Special objects of the invention are to provide an actuator capable of converting a small amount of electrical energy into a relatively large force through an appreciable range and to exert such force over the complete range of travel in a short time and to maintain such force continuously at the end of travel for so long as may be desired.

Actuators of such characteristics are particularly needed in aircraft to meet prescribed weight and power limitations, for example, where solenoids, screw jacks and the like have been used. A solenoid many times does not have sufficient power and can only apply power effectively through a short range of movement. These are heavy, for the work accomplished, impose large drain on the current source and can be used only for intermittent duty. Screw jack mechanisms are heavy, cumbersome and relatively slow acting.

The actuator of the present invention is free of the objections or limitations noted and provides a high potential force available at the start of travel and operable over and through a considerable range of movement.

Additional advantages and objects attained by the invention will appear or are set forth in the following specification.

The drawing accompanying and forming part of the specification illustrates a present practical embodiment of the invention. Structure, however, may be modified and changed in various ways, all within the true intent and broad scope of the invention as hereinafter defined and claimed.

Fig. 1 in the drawing is a broken perspective view illustrating an actuator of the present invention applied to the operation and control of a deicer air scoop.

Fig. 2 is an enlarged broken sectional view illustrating construction of the centrifugal actuating mechanism.

As shown in a general way in Fig. 1, the invention comprises a small electric motor 5, preferably chosen or designed for quick starting, high speed operation, such as a series motor, and driving a flyball governor 6, connected to advance a slidingly mounted shaft extension 7.

In this particular illustration, the member projected through centrifugal action of the governor is pivotally connected at 8, with one arm of a lever 9, pivoted at 10 and connected at the other end at 11, with the coupling arm 12 of a tail deicer air scoop 13.

Details of construction are shown in Fig. 2, where the motor shaft 14, is indicated as coupled by a torque transfer tube 15, to a shaft 16, which may be considered as an extension of the motor shaft, being journaled in a bearing support 17, at the end of the motor shaft.

The extensible member 7 is shown as a sleeve, slidable on that portion of the extension shaft 16, projecting beyond the bearing, and the flyball governor is shown as made up of weights 18, at the pivotally connected ends of the links 19, 20, said links pivotally connected respectively with a flange 21, integral or otherwise fixed on the inner end of sleeve 7 and a flange or collar 22 fixed to shaft 16.

The collar 22 forms a linkage anchor. It is shown fixed to the shaft by a transversely extending pin 23, which may be set to support this collar off the shaft, clear of the sleeve, the collar having a bore 24, to freely pass the sleeve. The latter is shown slotted in its opposite sides at 25, to freely slide over the intervening portions of the cross pin 23.

The outer end of the sleeve is shown reduced to the form of a screw stud 26, for supporting the inner race ring 27, of a ball bearing. The outer race ring 28 of this bearing is indicated as clamped by an annular screw cap 29, against an internal shoulder in the cup or housing 30, which latter is provided at its center, with a stud 38, carrying the pivot 8, for transmitting the motion to lever 9 or other object.

The bearing 27—28, is shown held in place on the end of the sleeve by a nut 31, preferably of the self-locking type. The cup shaped thrust transferring housing 30 is indicated as recessed at 32 to freely receive the nut and screw stud. The annular clamp nut 29 is shown as extending over the end of the sleeve but free of contact therewith.

A helical spring 33, engaged about the sleeve between the fixed abutment 22 and the sleeve flange 21, serves to retract the sleeve and to collapse the centrifugally extensible linkage.

If the centrifugally extended mechanism is positively connected with the device to be actuated, as in the illustration, the retracting spring may be relied upon and utilized for retracting the actuated device to an idle or rest position.

The deicer air scoop or other actuated device may have its own retracting spring, in which case the collapsing spring of the centrifugal actuator will supplement or, in case of spring failure, take the place of the actuated device return spring.

To enable the actuator to accommodate itself to changing centers it may be made up as a single complete unit and be mounted to swivel as much as need be.

In the illustration, the supporting block 17, is shown as carrying a C-shaped bracket 34, supporting the motor in a position substantially counterbalancing the centrifugal mechanism and said support is shown as having pivots 35, lined up parallel with the pivot 8 and operating in a mounting bracket 36.

This balanced pivotal mounting enables the centrifugal unit to swing freely to the changing centers resulting from operation of the connected devices.

The shaft 16, when separate from the motor shaft, as shown, is preferably supported in an anti-friction bearing or bearings. In the illustration, such support is provided by a ball bearing, of which the inner race ring 39, is secured on a reduced and shouldered portion of the shaft by a lock nut 40, and the outer race ring 41, is secured in a seat 42, in the side of block 17, by an overstanding plate 43. This separate mounting of the extension shaft avoids imposing any additional load on the motor bearings and provides a unitary centrifugal assembly attachable to the motor by screws 37, passing through bracket 34. The torque tube 15, may be flexible to allow for any slight misalignment and is shown connected over the ends of the shafts 14 and 16, by cross pin 44.

The thrust transmitting bearing 27—28, arranged as disclosed, provides an anti-friction connection, enabling the actuator to apply the full force developed by centrifugal action substantially free of frictional retarding effects. Connected as illustrated, the actuator has the ability to retract as well as to project an arm, lever, or other element. If desired though, the device may be coupled to operate in only one direction, for instance, to apply only a pushing or a pulling force. Thus in the case of a pushing operation only, the ball bearing head of the device, after accomplishing the desired result could retract free of the actuated object to leave an intervening space in the clear.

The quick starting, high speed motor provides instantly available power, operating through the centrifugal links to immediately convert rotary movement into a more powerful rectilinear movement. The mechanical advantage at the start of travel is infinite and therefore the force available at the start is infinite. The mechanical advantage drops as the travel increases but, as the speed and radius of travel of the weights increase, the force derived from this centrifugal action increases as the slide approaches maximum travel. The power rating therefore is this force available at maximum travel, distinguishing the invention over prior actuators, such as solenoids, having a weak starting force.

The power developed by the actuator is a yielding one, enabling the device to accommodate itself to accidental obstructions which may occur in the line of movement. The current drain of the motor is low, so that the developed force may be kept on continuously over extended periods without injury to any of the parts. This is important for operating devices such as illustrated, which must be shifted and then held in the shifted position, possibly for extended periods of time.

The operating characteristics and the simplicity of structure make the device applicable to many different uses, such as for closing electrical contact points, switches, valves, doors, cowl flaps, tail wheel locks, machine gun and cannon firing pins, control of engine starters, hydraulic brakes, automatic gear shift, gun chargers, bomb release mechanism and the like.

For some of these services, it may be desirable to have the centrifugal links withdraw, instead of extend the mechanism and this reverse action is to be considered part of the present invention. It is contemplated also, that the movable element, instead of being a sleeve slidable over a supporting shaft, may be in the nature of a rod slidable within a shaft of tubular form.

The small size and the light weight for power developed, render the device useful for many remote control and like purposes.

What is claimed is:

1. An actuator of the character disclosed, comprising a quick starting high speed electric motor, a shaft operated thereby, a sleeve slidable longitudinally on said shaft, a flange on the inner end of said sleeve, an abutment surrounding said sleeve and having a passage for free movement of the sleeve therethrough, a cross pin securing said abutment in fixed position on said shaft, said sleeve being longitudinally slotted to pass said pin, links pivotally connected together and pivotally connected at their ends with said flange and with said fixed abutment, centrifugal weights at the connected together ends of said links, a spring surrounding the sleeve and interposed between said fixed abutment and the flange of said sleeve and an antifriction thrust bearing on the outer end of said sleeve for transmitting thrust of the sleeve to other objects.

2. An actuator of the character disclosed, comprising a quick starting high speed electric motor, a shaft operated thereby, a sleeve slidable longitudinally on said shaft, a flange on the inner end of said sleeve, an abutment surrounding said sleeve and having a passage for free movement of the sleeve therethrough, a cross pin securing said abutment in fixed position on said shaft, said sleeve being longitudinally slotted to pass said pin, links pivotally connected together and pivotally connected at their ends with said flange and with said fixed abutment, centrifugal weights at the connected together ends of said links, a spring surrounding the sleeve and interposed between said fixed abutment and the flange of said sleeve, an anti-friction thrust bearing on the outer end of said sleeve for transmitting thrust of the sleeve to other objects, a stud projecting from the outer end of said sleeve and said thrust bearing comprising an inner race member mounted on said stud and an outer race member provided with means for connecting the same with a device to be actuated.

3. A centrifugal actuator unit, comprising a bearing block, a shaft journalled in said bearing block, a longitudinally shiftable member carried by said shaft, centrifugally weighted linkage connected between said shaft and member for effecting longitudinal shifting of said member in respect to said shaft and a bracket carried by said bearing block for supporting an electric motor with its shaft in alignment with the shaft journalled in said bearing block.

4. A centrifugal actuator unit, comprising a bearing block, a shaft journalled in said bearing block, a longitudinally shiftable member carried by said shaft, centrifugally weighted linkage connected betwen said shaft and member for effecting longitudinal shifting of said member in respect to said shaft, a bracket carried by said bearing block for supporting an electric motor with its shaft in alignment with the shaft journalled in said bearing block, means for connecting said shiftable member with a device to be actuated and a swivel mounting for the bearing block.

5. A centrifugal actuator unit, comprising a bearing block, a shaft journalled in said bearing block, a longitudinally shiftable member carried by said shaft, centrifugally weighted linkage connected between said shaft and member for effecting longitudinal shifting of said member in respect to said shaft, a bracket carried by said bearing block for supporting an electric motor with its shaft in alignment with the shaft journalled in said bearing block, said shaft projecting from one side of the bearing block and said motor mounting means projecting from the opposite side for enabling a motor supported thereby to counterbalance weight of the projecting shaft and centrifugal linkage.

6. A centrifugal actuator, comprising a mounting bracket, a motor support swivelled in said bracket, an electric motor carried by said motor support, shafting carried by said support and operated by said motor, a longitudinally shiftable thrust transmitting member carried by said shafting, centrifugal linkage connected between said shafting and thrust transmitting member and spring means for collapsing said centrifugal linkage.

7. A centrifugal actuator, comprising a mounting bracket, a motor support swivelled in said bracket, an electric motor carried by said motor support, shafting carried by said support and operated by said motor, a longitudinally shiftable thrust transmitting member carried by said shafting, centrifugal linkage connected between said shafting and thrust transmitting member, spring means for collapsing said centrifugal linkage, said shiftable member being in the form of a sleeve slidably engaged on said shafting and connected at one end with said centrifugal linkage, an abutment connected with the other end of said linkage, a cross pin securing said abutment to said shafting, said sleeve sliding through said abutment and slotted for passage of said cross pin and a thrust transmitting head on said sleeve.

RAY RICHARD JENNER.

REFERENCES CITED

The following references are of record in the file of this patent:

UNITED STATES PATENTS

| Number | Name | Date |
| --- | --- | --- |
| 704,863 | Creveling | July 15, 1902 |
| 1,907,985 | Leland | May 9, 1933 |
| 1,961,416 | De Luca | June 15, 1934 |
| 2,021,941 | Loftis | Nov. 26, 1935 |
| 2,141,772 | Slatler | Dec. 27, 1938 |
| 2,349,758 | Raspet | May 23, 1944 |